April 22, 1969 R. S. OTSTOT ET AL 3,440,388
METHOD FOR MACHINING WITH LASER BEAM
Filed April 4, 1966
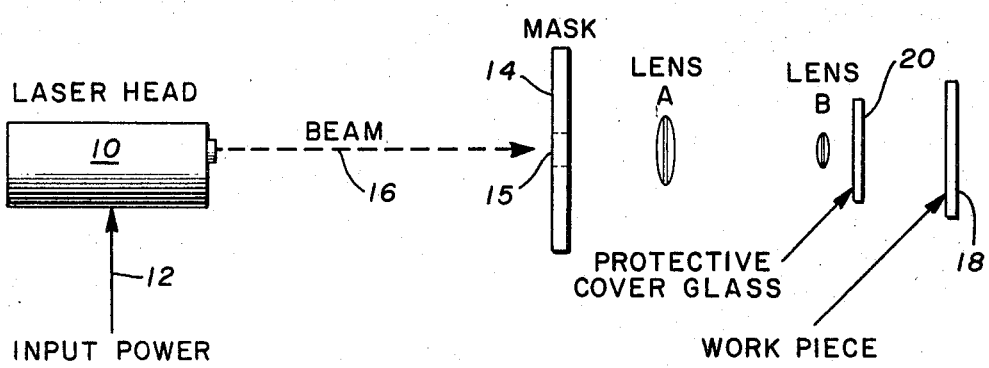
INVENTORS
ROGER S. OTSTOT
DURWOOD G. BLAND
JAMES W. MEEKS
Roy H Massengill
ATTORNEY

United States Patent Office 3,440,388
Patented Apr. 22, 1969

3,440,388
METHOD FOR MACHINING WITH LASER BEAM
Roger S. Otstot, Raleigh, and Durwood Gene Bland and James W. Meeks, Durham, N.C., assignors to Monsanto Company, St. Louis, Mo., a corporation of Delaware
Filed Apr. 4, 1966, Ser. No. 539,885
Int. Cl. B23k 9/00, 15/00, 9/16
U.S. Cl. 219—69         2 Claims

ABSTRACT OF THE DISCLOSURE

A method for drilling holes through hard, solid materials, such as steel and tungsten, with a laser includes the improvements of coating the light entrance and exit surfaces of the material with paraffin oil and silicone grease.

---

The present invention relates to an improved method for drilling holes in extremely hard materials. More particularly, this invention relates to a method for drilling micron-sized holes or orifices in extremely hard and brittle workpieces with a laser beam.

Although the discovery of the laser occurred only recently, there have been many industrial applications envisioned for this amazing scientific development. One important achievement in the industrial field has been the successful drilling of micron-sized holes in materials such as industrial diamonds and superalloy metals. Heretofore, this laborious and tedious task has been performed by such techniques as ultrasonic and spark drilling. Perhaps the principal reason why drilling by laser appears to be so attractive is that the pulsed light beam emitted by the laser seems literally to tunnel its way through the workpiece without its energy becoming dispersed across the surface beyond the diameter of the beam. The graingrowth or fragmentary deterioration which is characteristic of holes drilled with continuous heating is avoided and thus facilitates the drilling of holes approximately the diameter of the focused laser beam itself. Not only can smaller holes be drilled with the laser, but the process can be accomplished in a fraction of the time required by the previously known methods. Both of these feats are explained by the fact that the coherent beam emitted by a laser actually vaporizes the material which it is focused upon.

Unfortunately there are some problems with laser-made holes. It has been found that undesirable results, such as the holes being tapered, the splatter of material around the entrance of the hole, and a raised rim formed around the entrance and exit of the hole, must be corrected in most instances. Therefore, the laser cannot be the complete answer to all drilling problems unless some technique can be provided to obtain holes which do not have to be reworked. If a method could be employed which would eliminate the problems stated above, it would represent an important improvement in the art of laser drilling.

Therefore, it is a principal object of the present invention to provide an improved method for drilling holes with a laser beam. Another object is to reduce the taper of laser-made holes. Another object is to eliminate the splatter of vaporized material around the entrance of laser-made holes. Another object is to reduce substantially the size of the rims around the entrance and exit of the holes. Other objects and advantages will become apparent from a reading of the description of the invention to follow.

The foregoing objects and others ancillary thereto are preferably accomplished as follows:

According to a preferred method for carrying out this invention, the workpiece is prepared for laser drilling by applying a thin film of material on the laser beam entry side of said workpiece prior to drilling. The exit side of said workpiece is coated with a reasonably heavy film of material. The surface entry coating should be either a liquid substance having low surface tension, or a thin sheet of material such as aluminum foil bonded thereto which may be removed easily after the hole has been made. When using a liquid it is preferable to select one which readily wets the surface to insure that a thin flat film can be deposited which will not affect the focus of the laser beam. The liquid selected should also have a relatively low vapor pressure at a room temperature to prevent a sizable amount of evaporation of the liquid prior to drilling. There are a number of liquids which have the necessary properties, but paraffin oil has proven to be an excellent coating agent for the beam entry side. Quite unexpectedly, when a drop of paraffin oil is placed on the workpiece surface at the point to be drilled, the splatter around the entrance of the hole is essentially eliminated and the size of the rim at the hole entrance and exit is substantially reduced. Also the discovery has been made that when the exit surface is coated with a viscous material, such as silicone grease, the taper of the hole is reduced in addition to minimizing the rim on the exit surface. It is theorized that the grease prevents escape of volatile molten material from the exit side, thus forcing this material to exit through the entrance of the hole causing more material to be eroded or vaporized at the hole exit which increases the exit diameter to reduce the objectionable taper that results when a coating is not employed. After the workpiece has been coated, the holes are made in accordance with procedures which will be explained in detail herein to follow.

This invention provides the advantages of drilling holes in hard and brittle materials with a laser which do not require additional time consuming finishing operations such as machining and polishing. Laser-drilled holes which have been coated in accordance with this invention are replicas of the patterned light beam employed and the entrance and exit cross sections are essentially the same. For example, when a circular-shaped light beam is employed the resultant holes are substantially round and have essentially the same entrance and exit diameters. The surface coatings of this invention improve the laser-drilled holes made in hard metals ranging from brass to the superalloys and especially with the polycrystalline ceramics and single crystals such as industrial gems. The industrial gems include diamonds, sapphires and rubies which have been processed for special industrial applications.

The novel features considered characteristic of the present invention are set forth with particularity in the appended claims. The invention itself however will be best understood from the following description thereof when read in connection with the accompanying drawing in which:

A single figure shows a side elevational view of a laser drilling arrangement typical of the set-up preferred for carrying out the drilling operations in which the concepts of the present invention are employed.

In the drawing there is shown a laser head 10 which is preferably a solid state pulse laser that is not Q-switched since the longer pulse width of light from a non-Q-switched laser is advantageous in drilling operations. The laser head houses a flash tube and laser rod enclosed in an eliptical cavity, not shown. The head 10 is powered by a power supply 12 capable of delivering enough energy to perform the required drilling operation for a particular workpiece. A mask 14 is employed to shape the light beam 16 prior to being focused by lens A and B. In the arrangement shown, the mask 14 is provided with a circular hole 15 to facilitate drilling a round hole. A workpiece 18 is positioned with the surface nearest the lens being at the focal point of lens B. Although a double lens arrangement is shown, it will be understood that either a single lens or several lenses may be used, the only restriction being that the last lens nearest the workpiece be positioned at its focal length from the surface of said workpiece. A protective glass 20 is positioned between the workpiece 18 and the adjacent lens B to prevent molten or vaporized material from damaging the lenses. The protective glass 20 should be made from a material which will not alter the effectiveness of the laser light beam.

In order to illustrate a specific procedure for demonstrating the present invention, the workpiece 18 is coated on the surface of entry with a thin film of material having a planar surface which does not affect the focus of the lenses. The opposite or exit surface is uniformly coated with a dense material such as a grease. The coated workpiece is then positioned in alignment such that the front surface thereof is at the focal point of lens B and perpendicular to the common axis of the lenses and the laser beam. The mask plate 14 is positioned between lens A and laser head 10 to pattern or shape the light beam 16 as desired depending upon the configuration of the hole wanted in the workpiece 18. To initiate the laser beam, the power supply capacitors are charged to the appropriate energy level before this stored energy is released by an actuating mechanism to the flash tube which pumps the laser rod above its lasing threshold. The foregoing laser elements are of a well known type and are not shown or described in detail. The coherent beam 16 emitted by the laser rod passes through the aperture 15 in the mask 14 and to the lens arrangement, A and B, which focuses the beam on the coated surface. The workpiece absorbs energy from the coherent light beam and dissipates it in the form of intense local heat which actually vaporizes an area of the workpiece the size of the light beam in an instant to provide a hole having a well defined cross section. After the drilling operation has been completed the workpiece is cleaned and examined microscopically to check the quality of the newly formed hole.

The examples listed in the following tables are representative of the holes which can be laser-drilled employing the methods of this invention. These examples are intended to be illustrative and are not to be construed as limiting the invention beyond that which is disclosed elsewhere herein.

| Type of material drilled | Coatings | | Hole diameter, (inches) | | Hole shape | Effects produced around hole perimeter | |
|---|---|---|---|---|---|---|---|
| | Front | Back | Entry | Exit | | Entry | Exit |
| Tungsten, .010 inch thick. | None | None | .006 | .002 | Round | Much splatter | Much splatter. |
| | Paraffin oil | do | .006 | .003 | do | Very little splatter | Some splatter. |
| | do | Silicone grease | .006 | .004 | do | do | None other than slight slight scorching. |
| Brass, .005 inch thick. | None | None | .006 | .003 | Round | Some splatter | Some splatter. |
| | Paraffin oil | do | .006 | .0035 | do | None other than slight scorching. | Do. |
| | do | Silicone grease | .010 | .007 | do | Slight splatter | None other than slight scorching. |
| Beryllium oxide ceramic, .011 inch thick. | None | None | .006 | .003 | Round | Much splatter, large crater. | Some splatter. |
| | Paraffin oil | do | .007 | .0035 | do | No splatter or crater | Do. |
| | do | Silicone grease | .005 | .004 | do | do | Only slight scorching. |
| Sapphire (single crystal), .009 inch thick. | None | None | .005 | .002 | Round | Large crater | Some shattering. |
| | Paraffin oil | do | .005 | .003 | do | No crater | Do. |
| | do | Silicone grease | .005 | .004 | do | Very little effect at all. | Very clean. |
| Molybdenum, .005 inch thick. | None | None | .006 | .002 | Round | Small crater | None. |
| | Aluminum foil | Silicone grease | .006 | .0045 | do | No splatter | Do. |
| | Paraffin oil | do | .006 | .004 | do | Slight splatter | Do. |
| Tool steel, .005 inch thick. | None | None | .0035 | .002 | Round | Crater of molten metal and scorching. | Very small ridge. |
| | do | Silicone grease | .0025 | .002 | do | Large crater | None. |
| | Paraffin oil | do | .002 | .002 | do | Small crater | Do. |
| Tungsten, .005 inch thick. | None | None | .003 | .0015 | Round | Small crater | Small amount of splatter. |
| | do | Silicone grease | .002 | .002 | do | do | None. |
| | Paraffin oil | do | .002 | .002 | do | A little splatter | Do. |
| Molybdenum, .005 inch thick. | None | None | .003 | .0015 | Round | Small crater | Some splatter. |
| | do | Silicone grease | .002 | .00175 | do | Large crater | None. |
| | Parsffin oil | do | .002 | .00175 | do | No crater, some splatter. | Do. |
| Aluminum oxide ceramic, .010 inch thick. | None | None | .003 | .0025 | Round | Large crater | Some splatter. |
| | do | Silicone grease | .002 | .002 | do | do | None. |
| | Paraffin oil | do | .0025 | .002 | do | No crater | Do. |
| Ruby (single crystal), .004 inch thick. | None | None | .0025 | .002 | Round | Crater with hairline cracks on inner wall. | Some splatter. |
| | Paraffin oil | do | .002 | .002 | do | Crater and cracks practically eliminated. | Do. |
| | do | Silicone grease | .002 | .002 | do | No crater | Very little splatter. |

From the foregoing data it will be appreciated that the method of the present invention substantially reduces the problems encountered heretofore with laser drilling. Holes can now be laser drilled with reproducible accuracy having a high degree of confidence. The invention is applicable to drilling and machining of all types where minute amounts of material are removed from materials which are difficult to work with because of their hardness or brittleness factor. It has been found however that the invention is particularly advantageous and suitable for drilling micron-sized holes in extremely hard or brittle materials which have been extremely difficult and expensive to drill by conventional drilling techniques. Some specific examples are orifices in spinnerets which are employed to extrude continuous microdenier filaments from a flowable material. Another specific application for which the invention is useful is the drilling of watch jewels. The spinnerets and watch jewels are acceptable for industrial uses except for a nominal amount of finishing work that can be accomplished rapidly.

What is claimed is:

1. A method for drilling holes through hard, solid material with a coherent beam of light, the improvement comprising coating the light entrance surface of the material with paraffin oil and coating the light exit surface of the material with a dense viscous medium having a density greater than water.

2. The method of claim 1 wherein the dense viscous medium is silicone grease.

References Cited

UNITED STATES PATENTS

| 2,884,313 | 4/1959 | Browne | 219—69 |
| 2,974,215 | 3/1961 | Inoue | 219—68 |
| 3,154,371 | 10/1964 | Johnson | 219—121 |
| 3,265,855 | 8/1966 | Norton | 219—121 |
| 3,293,652 | 12/1966 | Roshon et al. | 219—121 |
| 3,314,073 | 4/1967 | Becker | 219—121 |
| 3,340,377 | 9/1967 | Okazaki et al. | 219—121 |
| 3,369,101 | 2/1968 | Di Curcio | 219—121 |

OTHER REFERENCES

I.B.M. Technical Disclosure Bulletin, S. H. Kremen, vol. 8, No. 3, August 1965, p. 434.

Laser in Metalworking, R. Microsa, Microtechnic, vol. 29, No. 2, April 1965, pp. 96–99.

RICHARD M. WOOD, *Primary Examiner.*

W. D. BROOKS, *Assistant Examiner.*

U.S. Cl. X.R.

219—121